US008396172B2

(12) United States Patent
Chalopin et al.

(10) Patent No.: US 8,396,172 B2
(45) Date of Patent: Mar. 12, 2013

(54) METHOD AND DEVICE FOR CORRELATING A SIGNAL, IN PARTICULAR AN ULTRA WIDEBAND SIGNAL

(75) Inventors: Hervé Chalopin, Aubagne (FR); Anne Collard-Bovy, Bouc Bel Air (FR); Philippe Courmontagne, Belgentier (FR)

(73) Assignees: STMicroelectronics (Rousset) SAS, Rousset (FR); Universite de Provence Aix-Marseilles, Marseilles (FR)

( * ) Notice: Subject to any disclaimer, the term of this patent is extended or adjusted under 35 U.S.C. 154(b) by 1143 days.

(21) Appl. No.: 12/165,739

(22) Filed: Jul. 1, 2008

(65) Prior Publication Data
US 2009/0022211 A1   Jan. 22, 2009

(30) Foreign Application Priority Data
Jul. 2, 2007   (FR) ...................... 07 56213

(51) Int. Cl.
*H04L 27/06* (2006.01)
(52) U.S. Cl. .......... 375/343; 375/316; 375/285
(58) Field of Classification Search .......... 375/130, 375/325, 343, 346
See application file for complete search history.

(56) References Cited

U.S. PATENT DOCUMENTS

| 4,007,330 | A |   | 2/1977 | Winters | 375/343 |
| 4,672,638 | A | * | 6/1987 | Taguchi et al. | 375/346 |
| 5,023,888 | A |   | 6/1991 | Bayston | 375/23 |
| 6,208,182 | B1 |   | 3/2001 | Marbot et al. | |
| 6,959,031 | B2 | * | 10/2005 | Haynes et al. | 375/130 |
| 7,822,152 | B2 | * | 10/2010 | Inagawa et al. | 375/343 |
| 2004/0042561 | A1 |   | 3/2004 | Ho et al. | 375/316 |
| 2004/0136439 | A1 |   | 7/2004 | Dewberry | 375/130 |

FOREIGN PATENT DOCUMENTS
EP   0843418   5/1998

OTHER PUBLICATIONS

O'Donnell et al., "*An Ultra-Wideband Transceiver Architecture for Low Power, Low Rate, Wireless Systems*", IEEE Transactions on Vehicular Technology, vol. 54, No. 5, Sep. 2005, pp. 1623-1631.

* cited by examiner

*Primary Examiner* — Sam K Ahn
*Assistant Examiner* — Janice Tieu
(74) *Attorney, Agent, or Firm* — Allen, Dyer, Doppelt, Milbrath & Gilchrist, P.A.

(57) ABSTRACT

The waveform of the signal varies according to the distance at which the signal was emitted, and several correlation signals are defined and correspond respectively to at least part of several sampled waveforms of the signal respectively emitted at several distances of different values so that the sum of the maxima of intercorrelations performed respectively between the various correlation signals and the various sampled waveforms is substantially constant over an interval including all the values of the distances. The correlation processing includes several elementary correlation processings respectively performed with the correlation signals and each delivering initial correlation values, as well as a summation of the homologous initial correlation values respectively delivered by the elementary correlation processings so as to obtain the correlation values.

18 Claims, 12 Drawing Sheets

METHOD AND DEVICE FOR CORRELATING A SIGNAL, IN PARTICULAR AN ULTRA WIDEBAND SIGNAL

FIELD OF THE INVENTION

The invention relates to the processing of a signal, in particular a correlation of this signal, especially to take account of the variation in waveform of this signal as a function of the emission distance. The invention applies in particular, but not exclusively, to pulse signals and, non-limitingly, to modulated ultra wideband pulse signals. An example of a modulation of a modulated ultra wideband (UWB) pulse signal is a digital pulse interval modulation, well known to the person skilled in the art by the abbreviation "DPIM". Such a modulated signal conveys coded digital information and the invention also applies advantageously but nonlimitingly to the transmission and decoding of such information within the framework of a local wireless transmission network.

BACKGROUND OF THE INVENTION

Ultra wideband-type technology is distinguished from narrowband and spread spectrum technologies in the sense that the bandwidth of the signal of ultra wideband type is typically between about 25% and about 100% of the central frequency or else greater than 1.5 GHz. Moreover, instead of transmitting a continuous carrier modulated with information or with information combined with a spreading code, which determines the bandwidth of the signal, ultra wideband technology involves the transmission of a series of very narrow pulses. For example, these pulses may take the form of a single cycle, or monocycle, having a pulse width of less than 1 ns. These pulses that are extremely short in the time domain, when transformed into the frequency domain produce the ultra wideband spectrum that is characteristic of UWB technology.

In UWB technology, the information conveyed on the signal may be coded for example by a digital pulse interval modulation (DPIM modulation). With such a modulation, the value of the spacing between two consecutive pulses of the pulse train codes the value of the information. Furthermore, each of the possible spacings is an integer multiple of a base duration.

The decoding of the pulse train comprises in particular the detecting of the positions of the various pulses so as to determine the values of the durations separating them. It is known that the amplitude of a signal decreases in the case of a transmission while the distance between the emitter and the receiver is increasing.

An approach for remedying this drawback includes supplementing the receiver with automatic gain control making it possible to adjust the amplitude of the signal received so as to allow good analog/digital conversion followed by correlation which will not be disturbed by waveforms of different amplitudes.

SUMMARY OF THE INVENTION

According to one mode of implementation and embodiment, there is provided a method and a device making it possible to dispense with the problems of signal amplitude variations due to the emission distance and also to dispense with an automatic gain controller.

According to one aspect, there is provided a method of processing a signal, comprising a reception of the signal, a first processing on the signal delivering a sample signal and a correlation processing on the sampled signal delivering correlation values. According to a general characteristic of this aspect, the waveform of the signal varying according to the distance at which the signal was emitted, several correlation signals corresponding respectively to at least part of several sampled waveforms of the signal respectively emitted at several distances of different values so that the sum of the maxima of intercorrelations performed respectively between the various correlation signals and the various sampled waveforms is substantially constant over an interval including all the values of the distances.

The correlation processing may comprise several elementary correlation processings respectively performed with the correlation signals and each delivering initial correlation values, as well as a summation of the homologous initial correlation values respectively delivered by the elementary correlation processings so as to obtain the correlation values. Thus, performing various elementary correlation processings respectively associated with various correlation signals in such a way that the sum of the correlations is substantially stable over a given distance interval, makes it possible to dispense with the amplitude variations of the signal over this distance interval while dispensing with automatic gain control or with a distance detection step combined with a selection of the correlation signal corresponding to the distance selection.

According to one mode of implementation in which the signal is a pulse signal, the shape of the pulses of the signal varying according to the distance at which the signal was emitted, the correlation signals are correlation masks corresponding respectively to at least part of several sampled pulses of the signal respectively emitted at several distances of different values so that the sum of the maxima of intercorrelations performed respectively between the various correlation masks and the various shapes of sampled pulses is substantially constant over the interval. Thus, instead of permanently detecting the distance between the emitter and the receiver so as to choose a suitable correlation mask, it is preferable to define several correlation masks (two masks may suffice) corresponding respectively to at least part of several pulses of the signal respectively emitted at several distances of different values, these masks being defined so that the sum of the maxima of intercorrelations performed respectively between the various correlation masks and the various shapes of sampled pulses is substantially constant over an interval including all the values of the distances.

Although the method applies to any signal, in particular any modulated pulse signal, an interesting application relates to a UWB signal modulated by a digital pulse interval modulation (DPIM modulation), in which the theoretical interval between two pulses is an integer multiple of a base duration. For a UWB signal which occupies for example a frequency band 6-10 GHz, it is necessary, in view of the Shannon-Nyquist criterion, to sample the signal at a sampling frequency of at least 20 GHz, and preferably 40 GHz, this making it necessary to resort to an analog-digital converter whose sampling frequency is of the order of several tens of GHz, i.e. one sample every 50 pico seconds at least. Now, at present, the embodying of such a component in CMOS technology presents difficulties.

Hence, one approach includes performing a serial/parallel conversion of the analog signal so that the first processing delivers successive groups of samples of the signal in parallel. This serial/parallel conversion may for example be carried out with a bank of analog-digital converters phase-shifted by the desired sampling period and clocked at lower frequencies (for example of the order of a hundred or a few hundred MHz). The first processing thus delivers successive groups of samples of the signal in parallel and each elementary correlation processing is performed on the successive groups of samples and delivers successive blocks of initial correlation values.

To reduce the loss of information resulting from a serial/parallel conversion of the signal, in particular when a pulse is situated in a truncation zone, it is advantageous for the first processing to furthermore comprise an initial processing for sampling the signal delivering successive blocks of N samples in parallel and a storage processing performing successive storings of the $M_m-1$ last samples of the blocks, $M_m$ being the number of samples (called –) of the correlation mask. Thus, each current group of samples comprises the $M_m-1$ stored samples of the previous block followed by the N samples of the current block.

According to one mode of implementation, the elementary correlation processing comprises N correlations in parallel performed on each group of $N+M_m-1$ samples with the correlation mask and delivers for each group of samples a block of N initial correlation values.

According to another aspect, there is proposed a device for processing a signal. The device comprises an input for receiving the signal, a first processor or processing means coupled to the input and able to deliver a sampled signal, a correlation processor or processing means coupled to the output of the first processing means and able to deliver correlation values. According to a general characteristic of this aspect the device comprises memory means storing several correlation signals corresponding respectively to at least part of several sampled waveforms of the signal respectively emitted at several distances of different values so that the sum of the maxima of intercorrelations respectively performed between the various correlation signals and the various sampled waveforms is substantially constant over an interval including all the values of said distances. The correlation processing means may comprise several elementary processing means able to respectively perform elementary correlation processings with said correlation signals and to each deliver initial correlation values, as well as summation means connected to the outputs of the elementary processing means and able to deliver the correlation values.

According to one embodiment in which the signal is a pulse signal, the shape of the pulses of the signal varying according to the distance at which the signal was emitted, the correlation signals are correlation masks corresponding respectively to at least part of several sampled pulses of the signal respectively emitted at several distances of different values so that the sum of the maxima of intercorrelations performed respectively between the various correlation masks and the various shapes of sampled pulses is substantially constant over the interval.

According to one embodiment in which the signal is a modulated ultra wideband signal, the first processing means are able to deliver successive groups of samples of the signal in parallel, each elementary processing means is able to perform elementary correlation processing on the successive groups of samples and deliver successive blocks of initial correlation values. According to one embodiment, the signal is an ultra wideband signal modulated by a digital pulse interval modulation.

According to one embodiment, each correlation mask comprises $M_m$ mask samples, the first processing means comprise sampling means delivering successive blocks of N samples in parallel a memory able to successively store the $M_m-1$ last samples of the blocks. Each current group of samples able to be delivered by the first processing means advantageously comprises the $M_m-1$ stored samples of the previous block, which are followed by the N samples of the current block.

Each elementary processing means is able to perform, for example, N correlations in parallel on each group of $N+M_m-1$ samples with the correlation mask and to deliver for each group of samples a block of N initial correlation values. The device comprises for example a signal processor incorporating the correlation processing means.

According to another aspect, there is also proposed a receiver of a wireless transmission system, for example a UWB receiver, comprising a processing device as defined above.

BRIEF DESCRIPTION OF THE DRAWINGS

Other advantages and characteristics of the invention will become apparent on examining the detailed description of nonlimiting modes of implementation and embodiments, and the appended drawings in which.

DETAILED DESCRIPTION OF THE PREFERRED EMBODIMENTS

An exemplary implementation and embodiment applied to a UWB signal modulated by a DPIM modulation will now be described while referring to the figures, although the invention is not limited to this type of particular application but relates in a more general manner to any signal on which it is envisaged to perform a correlation processing, for example to detect the content of this signal.

Figure 1:
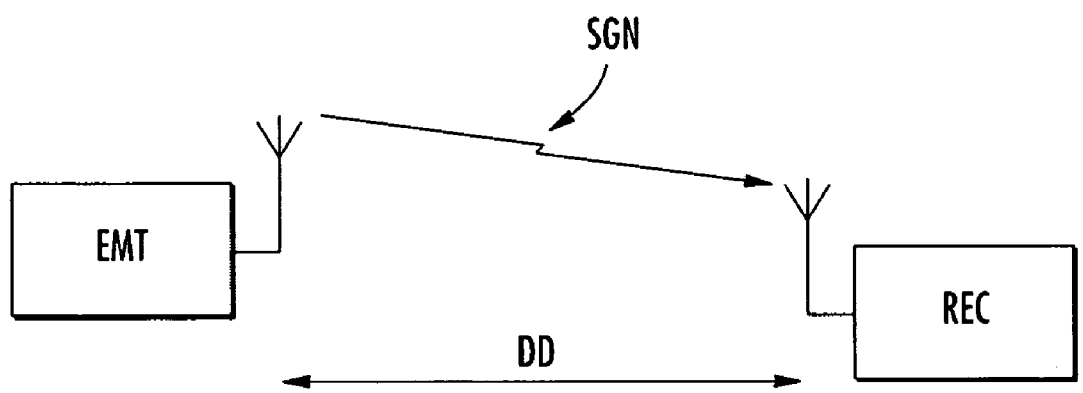
FIG. 1 is a schematic diagram illustrating an emitter and a receiver of a wireless communication system.
Figure 2:
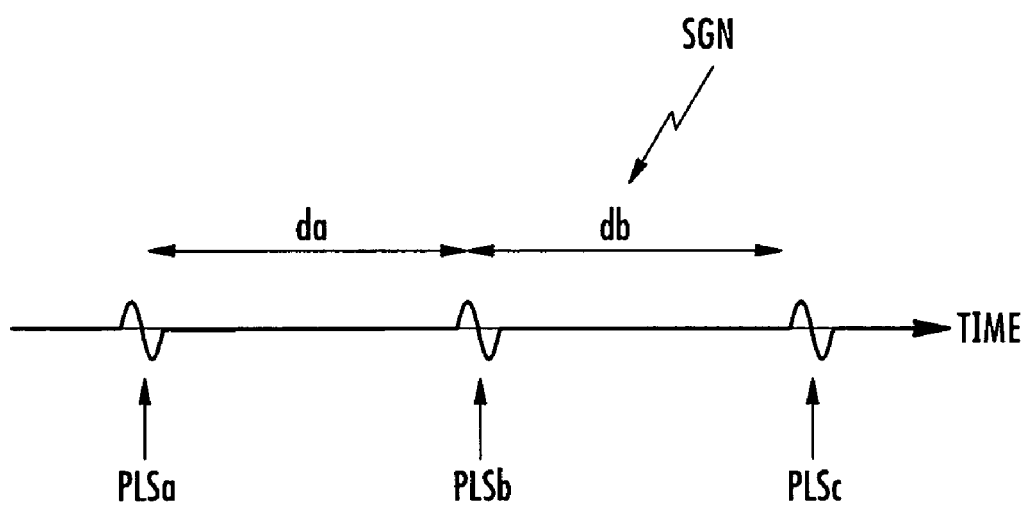
FIG. 2 is a timing diagram illustrating a DPIM modulation.

In FIG. 1, the reference EMT denotes an emitter for a wireless communication system transmitting to a receiver REC a signal SGN of the UWB type modulated by DPIM modulation. Additionally, the emitter and the receiver are separated by a distance DD. In FIG. 2, it is seen that the signal SGN comprises a pulse train only three of whose pulses, referenced PLSa, PLSb, PLSc have been represented for the sake of simplification.

The width of such a pulse is of the order of from 1 to 2 nanoseconds. The signal conveys coded information. The value of the interval (da, db) between two pulses codes the value of an information item. Thus, p information items are coded with the aid of p+1 pulses.

Furthermore, the theoretical interval between two pulses is an integer multiple of a base duration $T_{mod}$. This base duration $T_{mod}$ is for example equal to 400 picoseconds. And the various possible time intervals $d_i$ are equal to $(n+i) T_{mod}$. Thus, by way of example, if the various information items can take the values 0, 1, 2 or 3, that is to say in binary 00, 01, 10, 11, then a pulse separated from the previous one by an interval $d_0$ equal to $3T_{mod}$ will correspond to a value 0 for the cue. An interval $d_1$ equal to $4T_{mod}$ will correspond to a value 1 for the cue. An interval $d_2$ equal to $5T_{mod}$ will correspond to a value 2 for the cue and an interval $d_3$ equal to $6T_{mod}$ will correspond to a value 3 for the cue.

The pulses PLS possess characteristics of a pulse of the ultra wideband type in the sense that the ratio of the bandwidth of the pulse at mid-power to the central frequency is greater than a quarter, or else that the bandwidth at mid-power is greater than 1.5 GHz. By way of indication, the central frequency of a pulse may be equal to several GHz.

Figure 4:
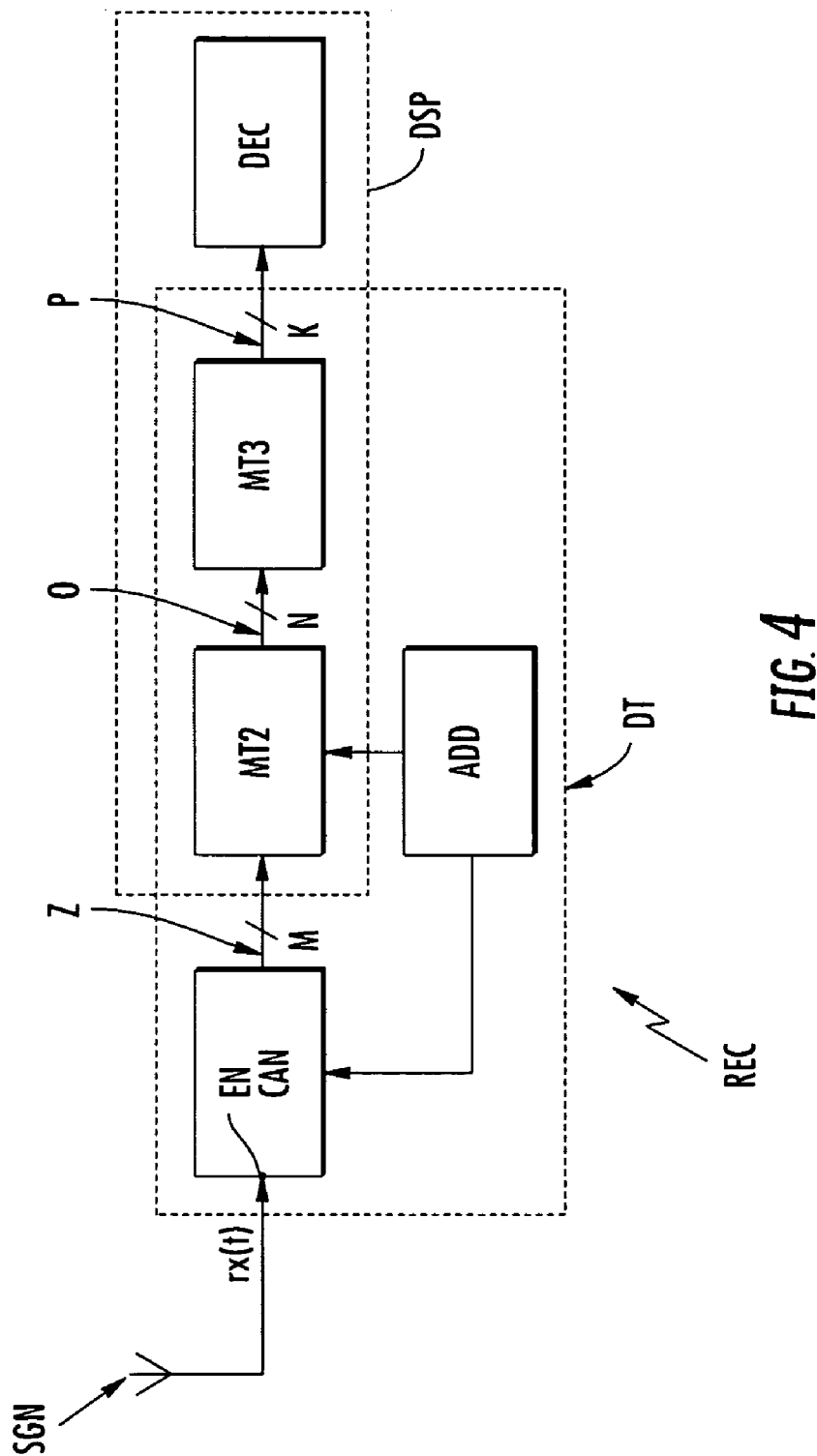
FIG. 4 is a schematic diagram illustrating an embodiment of a receiver of the system of FIG. 1.

As illustrated in FIG. 4, the receiver REC comprises an antenna receiving the signal SGN after transmission on a transmission channel which may be multipath. After entering the antenna and passing through the various conventional elements of an analog reception chain, such as for example a low noise amplifier, the temporal pulse signal rx, resulting from the signal SGN, is delivered at the input EN of the processing device DT. This input EN is in fact the input of first processing means CAN.

The signal rx is also a pulse signal. However, the shape of the pulses forming this signal rx may be different from the shape of the pulses of the signal SGN as a function of the characteristics of the reception means, in particular of the antenna, and of the disturbance induced by the transmission channel (ambient noise and multipaths). Stated otherwise each pulse of the signal rx is in fact the theoretical response of the system to the receipt of a pulse of the signal SGN and this theoretical response may vary as a function of the characteristics of the reception device or means.

Figure 3:
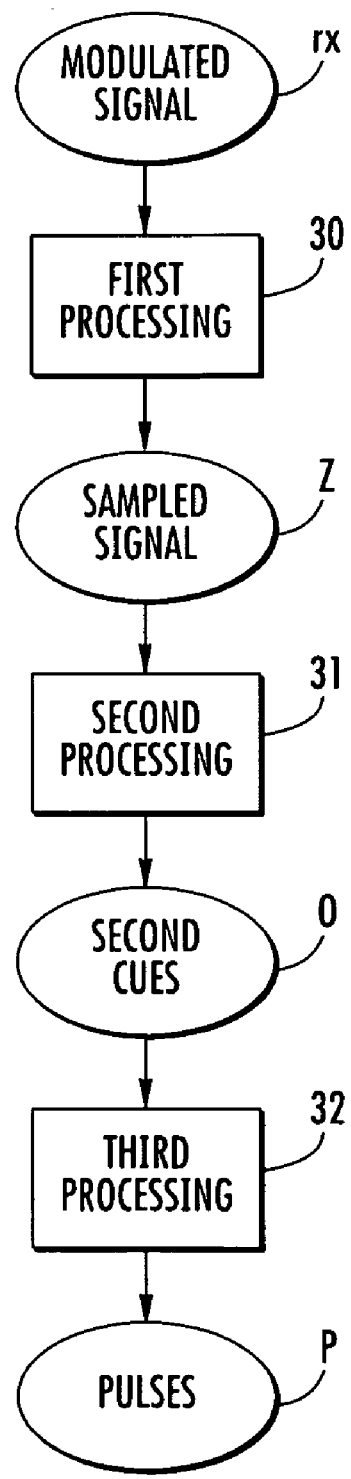
FIG. 3 is a flowchart schematically illustrating the main steps of a method of implementing a method of processing a signal.

As illustrated in FIG. 3, the modulated signal rx undergoes a first processing 30 delivering a sampled signal Z. A second processing 31 is performed on the sampled signal Z to deliver second information items O on which a third processing 32 is performed, making it possible to detect the pulses P. The second processing 31 comprises, as will be seen in greater detail hereinafter, a correlation processing including several elementary correlation processings with several correlation masks corresponding to the shape of at least part of several sampled pulses of the signal emitted at different distances DD.

Hardware-wise, the implementation of this method is incorporated within a processing device DT such as for example that illustrated schematically in FIG. 4. The first processor or processing means CAN are able to perform the first processing. A signal processor DSP can incorporate in software fashion the second processor or processing means MT2 and the third processor or processing means MT3 able respectively to perform the second and third processings 31 and 32.

A decoding module DEC, incorporated likewise within the processor DSP, allows the decoding of the information conveyed by the signal SGN having regard to the values of the intervals separating the various pulses detected. The processing device DT furthermore comprises a memory MM capable of storing the various correlation masks.

Figure 5:
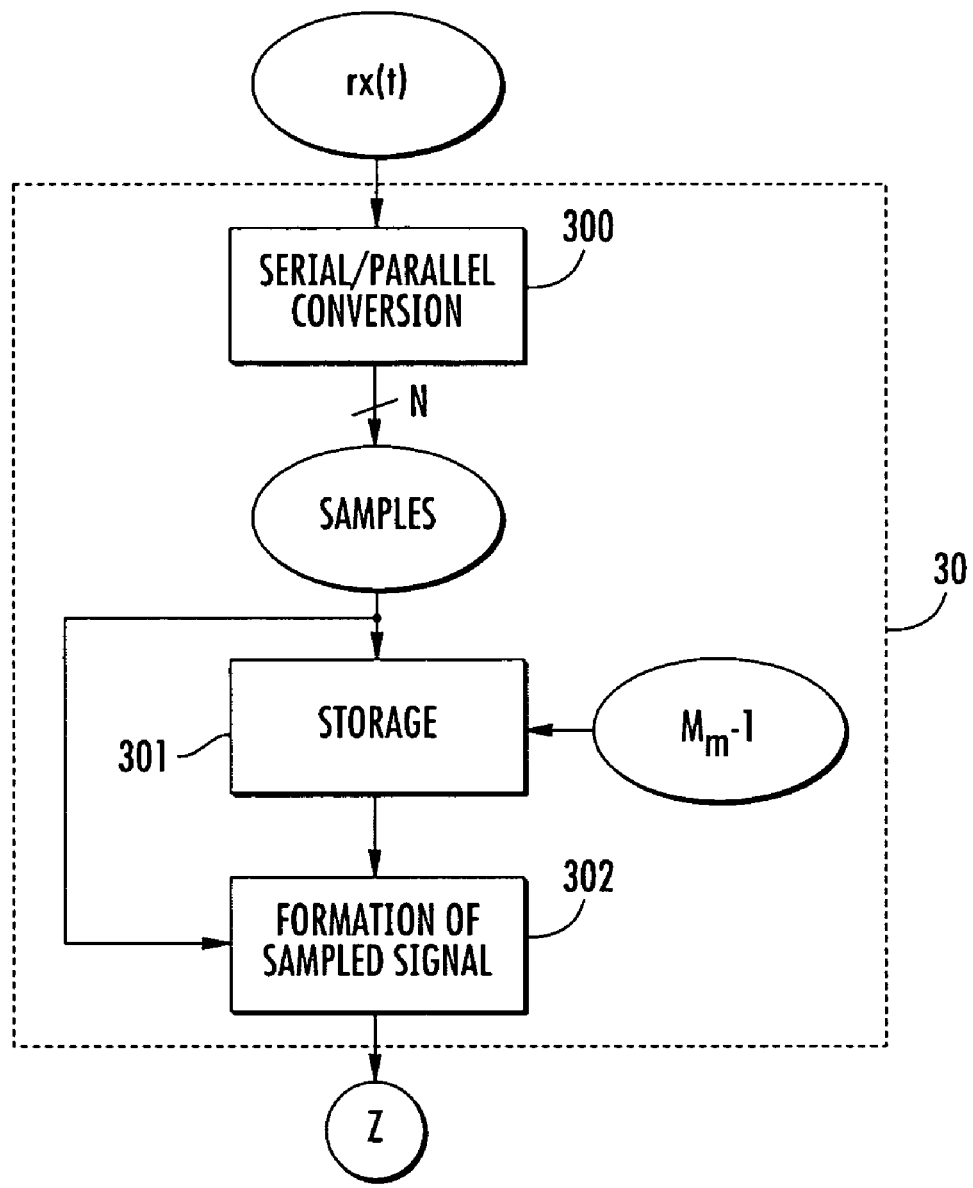
FIGS. 5 to 14 are schematic diagrams illustrating in greater detail various aspects of the method and of the device illustrated in FIGS. 3 and 4 respectively.
Figure 7:
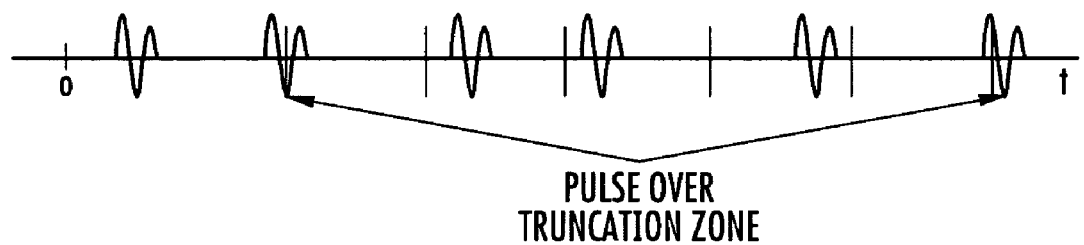

An exemplary first processing 30 is illustrated more particularly in FIG. 5. This comprises a serial/parallel conversion 300 of the signal rx, which is in fact akin to an initial sampling processing delivering successive blocks of samples in parallel, for example successive blocks of N samples. This said, separating a signal into several parallel blocks, which amounts to a serial/parallel conversion, may lead to a loss of information in the case where a pulse of the signal is situated at the site of separation or truncation zone as illustrated in FIG. 7.

Hence, there is provided a storage processing 301 performing successive storings of the $M_m-1$ last samples of the blocks of samples. Here, $M_m-1$ represents the size, decreased by one sample, in number of samples of the correlation mask which will be used. The formation 302 of the sampled signal Z then comprises the formation of successive groups of $N+M_m-1$ samples More precisely, a current group of samples of the signal Z comprises the $M_m-1$ stored samples of the previous block followed by the N samples of the current block delivered on completion of the initial sampling processing 300.

Thus, the first processing 30 is globally a serial/parallel conversion which delivers a sampled signal Z formed of a succession of groups of samples, each group of samples here comprising $N+M_m-1$ samples. The samples may be coded on a certain number of bits depending on the quantization. This said, by way of example, the case of a quantization on two bits will be described here. Thus, each sample takes values from among the values −1, 0 and 1. Their respective binary values are 11, 00, 01. And, in this precise case, the high-order bit represents the sign of the sample.

Figure 6:
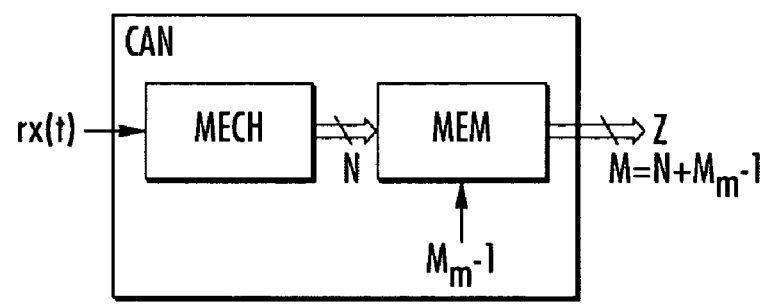

Hardware-wise, the first processing means CAN may be embodied as illustrated in FIG. 6. More precisely, sampling means MECH deliver the successive blocks of N samples in parallel and a memory MEM is provided for temporarily storing the $M_m-1$ last samples of each block with a view to forming each group of M samples, M being equal to $N+M_m-1$.

When the central frequency of the pulses of the signal rx is of the order to several GHz, the respective sampling frequency of the signal is preferably of the order of several tens of GHz. An approach allowing the embodiment of such means in CMOS technology may include the use of a bank of N analog-digital converters, each clocked at a lower frequency Fe, for example of the order of a hundred MHz, and mutually phase-shifted by a time offset equal to 1/N.Fe. Thus, the effective sample frequency is equal to N.Fe. By way of indication, if N is equal to 256, and if each analog-digital converter samples at Fe=156.25 MHz, a multiphased sampling with an effective sampling frequency N.Fe equal to 40 GHz is obtained.

Figure 8:
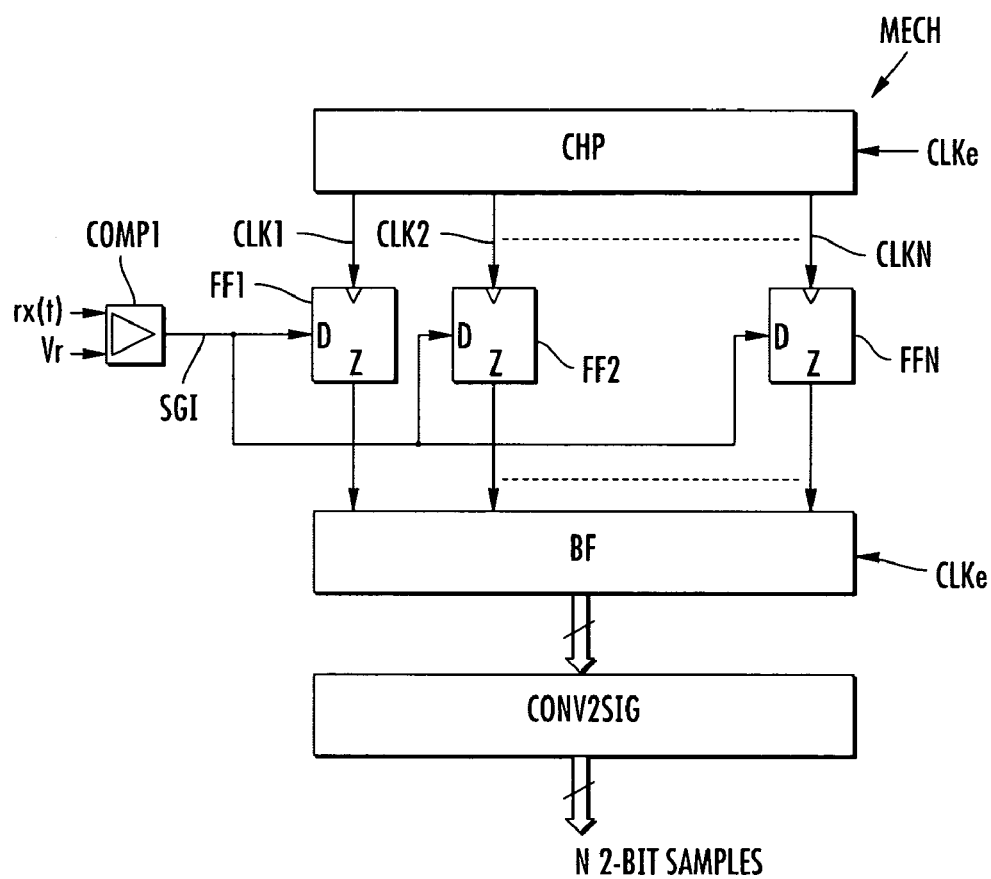
Figure 9:
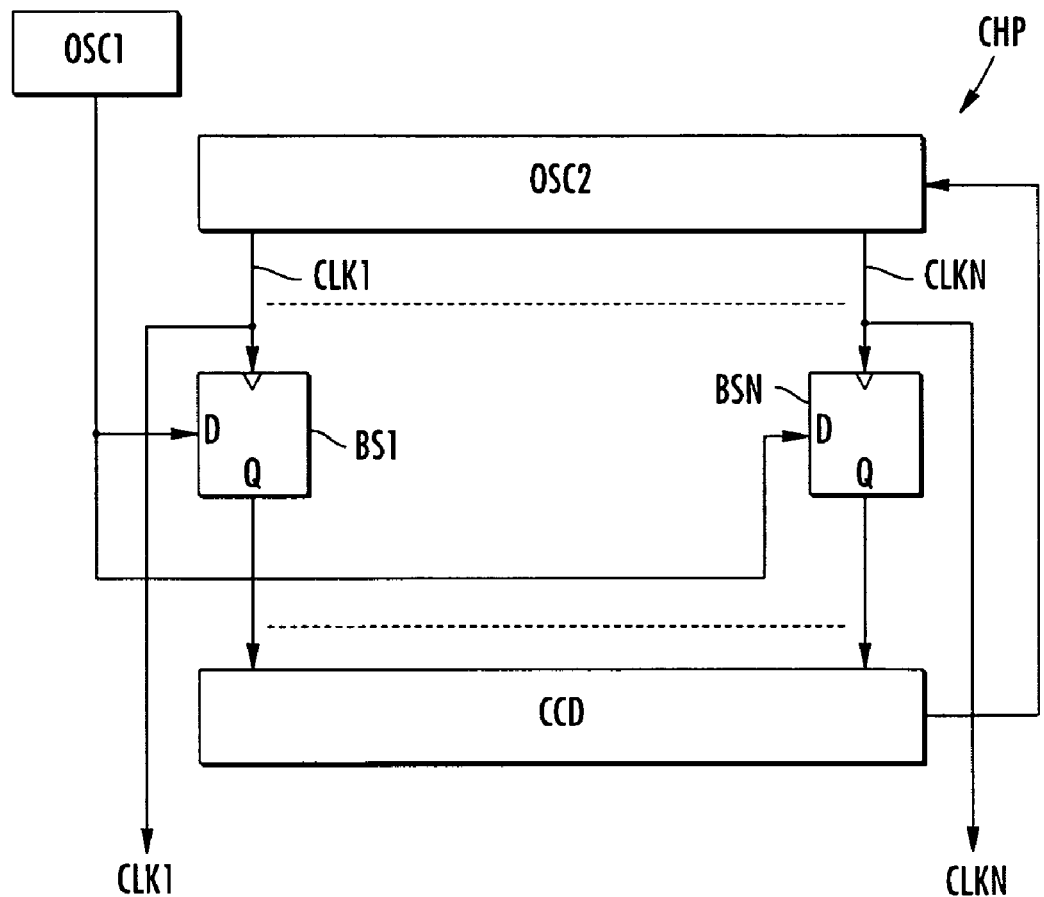

Another possible approach is of the type illustrated in FIGS. 8 and 9. It provides for the use of D flip-flops. The signal rx (t) is delivered into a comparator or comparison means COMP1 (FIG. 8) so as to be compared with a reference voltage Vr, for example zero voltage, so as to deliver a signal SGI capable of taking three logic states "+1", "0", "−1" as a function of the level of the signal rx with respect to the reference value Vr.

The sampling device or means MECH comprises a programmable clock circuit CHP receiving a base clock signal CLKe having the frequency Fe and delivering N elementary clock signals CLK1-CLKN all having the same frequency Fe but mutually temporally offset by 1/N.Fe. The sampling means MECH also comprise N D-type flip-flops, respectively referenced FF1-FFN. These flip-flops are respectively controlled by the N elementary clock signals CLK1-CLKN and they all receive the signal SGI as input.

In tempo with the successive rising edges of the various elementary clock signals CLK1-CLKN, the signal SGI will therefore be sampled and the N successive samples will be stored in an output register BF controlled by the base clock signal at CLKe. On each rising edge of this base clock signal CLKe (the rising edges being spaced apart by a duration Te representing the period of this base clock signal), the N samples will be delivered in parallel. In practice, the programmable clock circuit CHP may be composed of a clock, for example a quartz, and of a certain number of delay elements arranged in series at the output of the clock. In this regard, the person skilled in the art will if desired refer to European Patent Application No. 0 843 418.

One of the difficulties of this sampling at very high frequency resides in the fact that the elementary clock signals should be delivered with a precision ("jitter") which is very low, for example of the order of a few picoseconds. This is the reason why it is then advantageous for the programmable clock circuit CHP to comprise a digital phase-locked loop comprising (FIG. 9) for example a programmable ring oscillator OSC2, delivering the N elementary clock signals CLK1-CLKN. This ring oscillator is controlled on the basis of a control circuit CCD receiving the respective outputs from N flip-flops BS1-BSN. These N flip-flops are respectively controlled by the N elementary clock signals CLK1, CLKN and receive on their D input the base clock signal CLKe emanating for example from a conventional quartz oscillator OSC1.

The person skilled in the art may, in this regard, refer, if necessary, to U.S. Pat. No. 6,208,182, regarding in particular to the control of the ring oscillator. However, the general principles thereof are recalled here. The control circuit CCD comprises means for comparing samples pairwise, so as to determine whether a state transition has occurred in a time interval separating the two samples, this comparison being performed over at least two cycles, consecutive or otherwise, of the ring oscillator. This comparison is performed in such a way that:

- if, during the second cycle, a comparable state transition is detected in the same interval, the control of the ring oscillator is not modified;
- if, during the second cycle, a comparable state transition is detected in a later interval, the period of the ring oscillator is decreased; and
- if, during the second cycle, a comparable state transition is detected in an earlier interval, the period of the ring oscillator is increased.

Of course, the programmable clock circuit CHP which was described with reference to FIGS. 8 and 9 could also be used to generate the various signals for clocking the bank of N analog-digital converters alluded to above in the previous approach.

The sampling means MECH may also comprise in the present case, N blocks CONV2SIG of conventional structure each converting the sample received as input into a sample of two bits (a sign bit and a data bit).

More precisely, if the sample received as input has the value 0, the two data sign bits equal 0. If the value of the input sample is +1, then the sign bit is equal to 0 and the data bit is equal to 1 whereas if the sample received as input has the value −1, both the sign and data bits are equal to 1. The output of the sampling means MECH therefore delivers in the example described here successive groups of N samples of 2 bits.

Figure 10:
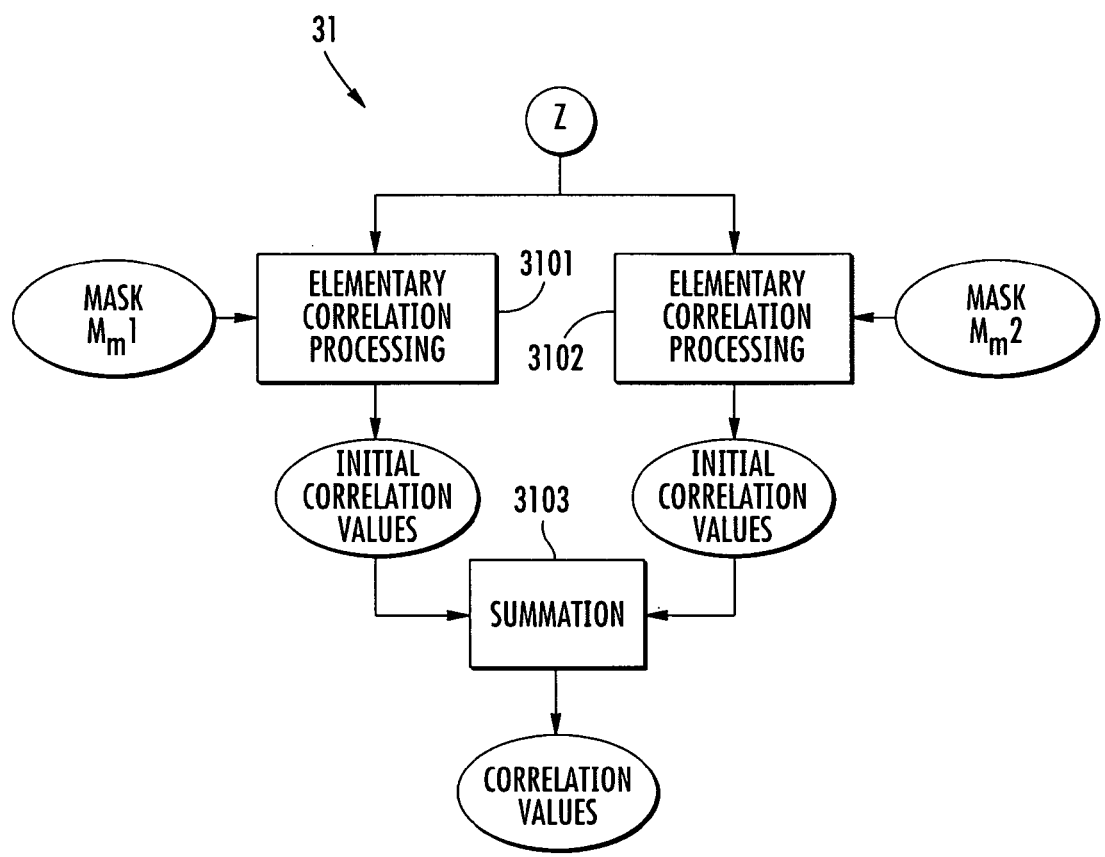

If reference is now made more particularly to FIG. 10, it may be seen that the second processing 31 performed on the sampled signal z comprises several elementary correlation processings (here two referenced 3101 and 3102) respectively performed with several different correlation masks Mm1 and Mm2. The definition of these correlation masks will be returned to in greater detail hereinafter.

Each elementary correlation processing delivers initial correlation values. The homologous initial correlation values delivered by the elementary correlation processings will then be summed (step 3103) so as to deliver the correlation values.

Figure 11:
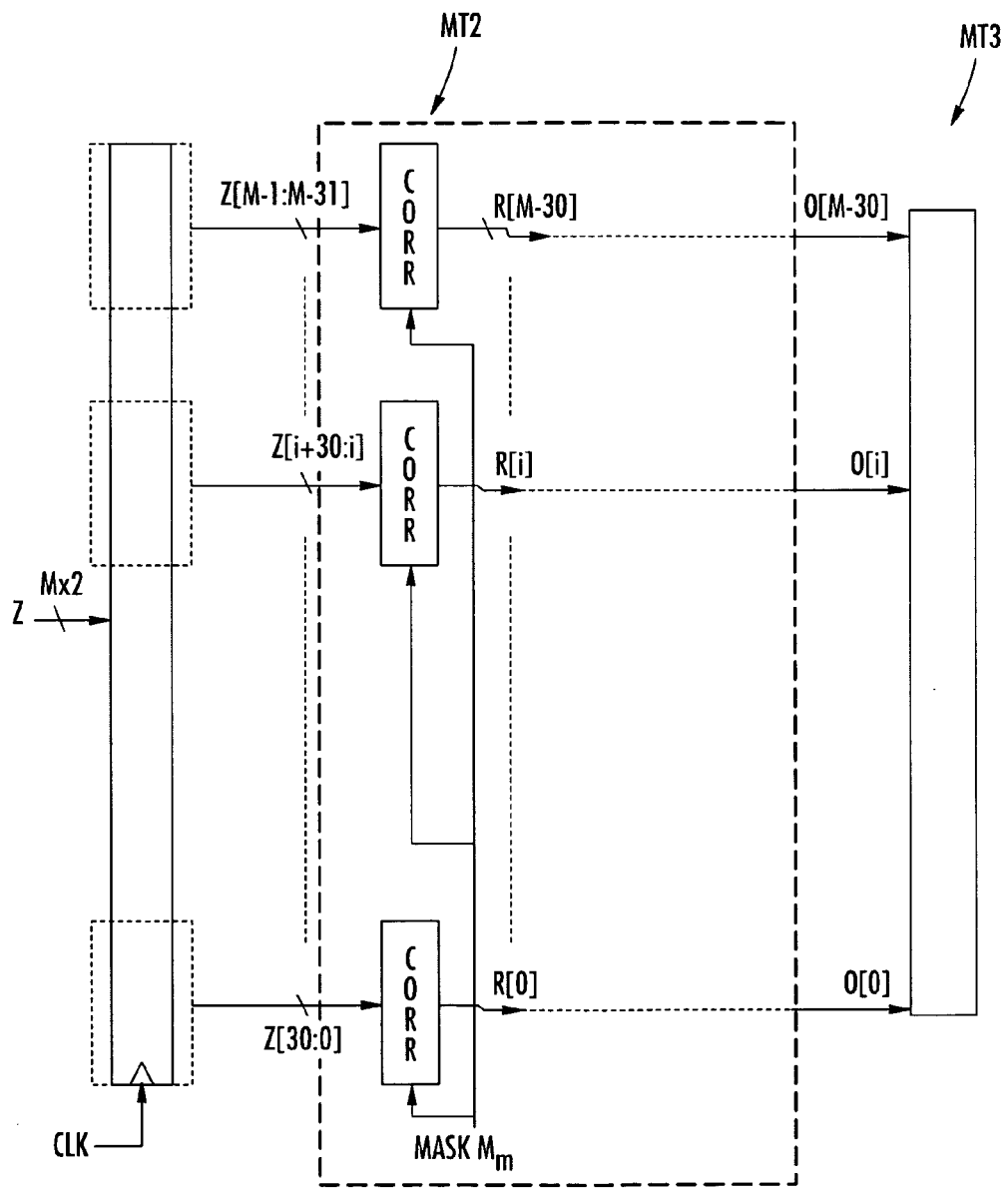

Reference will now be made more particularly to FIG. 11 to describe an elementary correlation processing performed within the second means MT2, it being understood of course that all the elementary correlation means are analogous. As may be seen more particularly in FIG. 11, the elementary correlation processing 3100 here comprises N correlations in parallel performed respectively by N two-bit correlators CORR. These N parallel correlations are performed on each group of $N+M_{m-1}$ samples with the correlation mask $M_m$.

As illustrated in FIG. 11, each correlator performs the correlation between groups Z[i+30:i] of 31 samples and 31 mask samples also coded on two bits. The number 31 corresponds to the size of the correlation mask. N correlation values R[0]-R[M−30] are thus obtained, that is to say R[0]–R[255] (N=256). The correlation values can take any integer value between 0 and the size of the mask, that is to say here 31, and are consequently coded on 5 bits here.

Each correlation performed by the two-bit correlator CORR may be obtained conventionally by a bitwise multiplication series. It is also possible to use as a variant an operation C correlating two values x and y coded on two bits and defined by the following formula:

$$\overline{C(x,y)} = \overline{x_1 \oplus y_1} \cdot x_0 \oplus y_0, \text{ where } x=\{x_1,x_0\} \text{ and } y=\{y_1,y_0\}.$$

Figure 12:
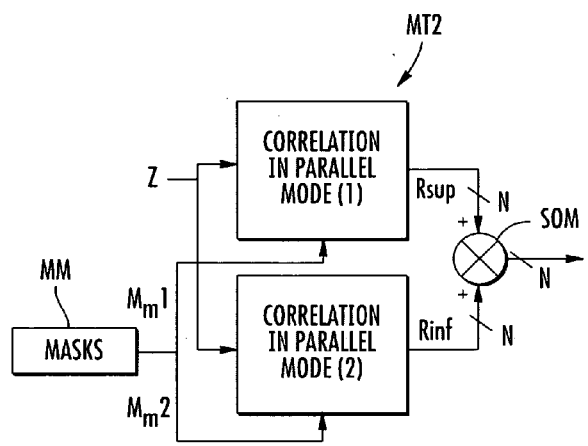

Hardware-wise, the second processing means MT2 are for example those illustrated in FIG. 12. The memory MM stores the two masks defined previously. Then the correlation means, embodied in software form within the processor DSP, perform in parallel the two elementary correlation processings with the two masks $M_{m1}$ and $M_{m2}$. The correlation results $R_{sup}$ and $R_{inf}$ are summed in a summator SOM so as to give the correlation values R.

The N correlation values R[i] are then preferably compared in a thresholding unit or means formed here, for example, of N comparators all using one and the same threshold value. For example, it is possible to choose a threshold value VS equal to 70% of the correlation maximum. The thresholding means then deliver successive groups of N threshold values O[i] (FIG. 11) which here form the N second information items. And, for i varying from 0 to N−1, O[i] is equal to 1 if R[i] is greater than VS and equal to 0 otherwise.

Figure 13:
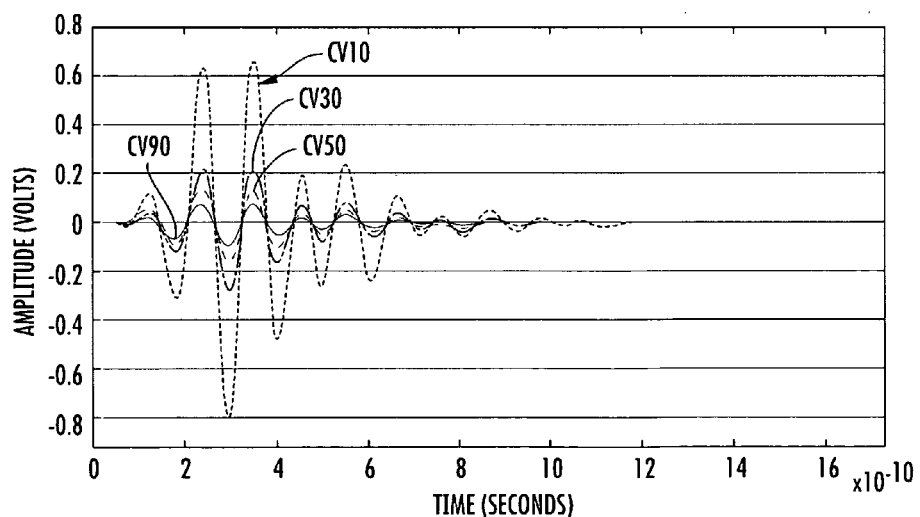
Figure 14:
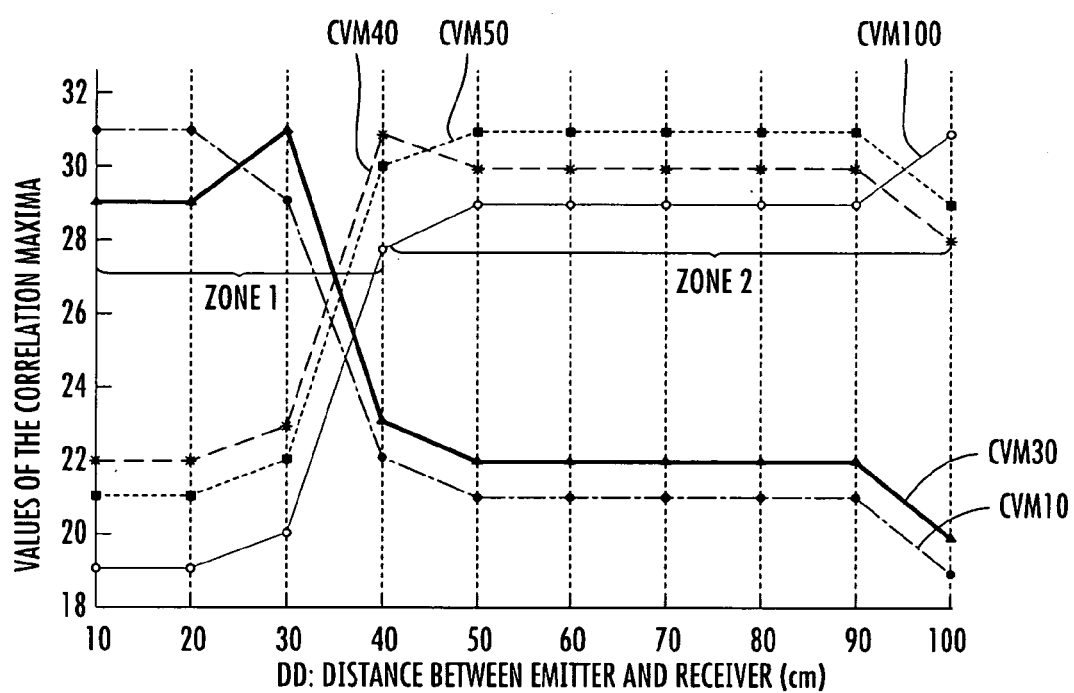

Referring more particularly to FIGS. 13 and 14, the definition and the meaning of the various correlation masks used by the various elementary correlation processing means will now be described. It is known that the amplitude of a signal decreases in the transmission channel as the distance between the emitter and the receiver increases. An approach for remedying this drawback includes supplementing the device with automatic gain control making it possible to preserve for any distance an amplitude that is compatible with good analog-digital conversion, and with a conventional correlation.

This said, another approach, making it possible to circumvent the signal amplitude variation problems due to the emission distance and to also dispense with an automatic gain controller is illustrated by way of example in FIGS. 13 and 14. In FIG. 13 are represented various pulse shapes received at the level of the receiver REC, for emission distances DD (FIG. 1) varying from 10 cm to 100 cm.

A decrease in the amplitude of these various pulses is actually observed. Thus, curve CV10 represents the shape of a pulse for a distance DD of 10 cm. Curve CV30 represrents the shape of a pulse for a distance DD of 30 cm. Curve CV50 represents the shape of a pulse for a distance DD equal to 50 cm and curve CV90 represents the shape of a pulse for a distance DD equal to 90 cm. A correlation mask corresponding to at least part of the corresponding sampled pulse shape is then defined for each of these pulse shapes and all the intercorrelations between the various correlation masks and the various shapes of sampled pulses are performed.

Next, the evolution of the maxima of these intercorrelations is examined. These evolutions are presented in FIG. 14. Thus, curve CVM10 represents the evolution of the intercorrelation maxima using masks associated with a distance DD equal to 10 cm and a distance DD equal to 20 cm. Curve CVM30 illustrates the evolution for a mask associated with a distance PD equal to 30 cm. Curve CVM40 corresponds to the evolution for a mask associated with the distance DD equal to 40 cm. Curve CVM50 represents the evolution for masks associated with distances DD equal to 50, 60, 70, 80 and 90 cm. Curve CVM100 represents the evolution for a mask associated with the distance PD equal to 1 m.

All these evolutions reveal in the particular example which is described, two pulse groups. These two zones correspond respectively to distances of less than 40 cm and distances of greater than or equal to 40 cm. This said, it is seen that it may not be possible a priori to determine a correlation mask valid for any distance lying between 10 and 40 cm, as well as another correlation mask valid for any distance lying between 40 and 100 cm.

On the other hand, it is conceivable to define two masks, the sum of the maxima of whose intercorrelations is substantially constant over an interval, including all the values of the different distances considered, here the distances lying between 0 and 1 meter. And, as illustrated in FIG. 10, the correlation processing 31 will comprise two elementary correlation processings 3101 and 3102 performed respectively with the two masks $M_{m1}$ and $M_{m2}$ selected. By way of example, the mask associated with the distance DD equal to 20 cm may be chosen as a first mask $M_{m1}$ and the mask associated with the distance 70 cm may be chosen as mask $M_{m2}$.

Such an approach may be generalized to A masks and A elementary correlation processings, with A greater than 2, if the distance and the waveform so require. The multiple elementary correlation processings may be performed simultaneously or one after the other after a latency time. The detection of pulses will be performed in the means MT3 on the second information items O. This detection can be performed by any conventional means, for example an analysis of all the correlation values.

As a variant, it is also possible to use a packet-wise detection such as that described in the French patent application filed on the same day as the present application in the names of the applicants and entitled "method and device for processing a pulse train of a modulated signal, in particular an ultra wideband signal modulated by a digital pulse interval modulation".

The invention is not limited to the embodiment and mode of implementation just described but encompasses all variants thereof.

Thus, not only is the fact of using a multiple correlation with various correlation signals (for example correlation masks) not limited to a pulse signal but applies to any signal necessitating a correlation, but further it is not necessary if the application does not so require, to perform a serial/parallel conversion of the signal before correlation. Specifically, the invention applies also to a conventional serial sampling of the signal.

That which is claimed is:

1. A method of processing a signal comprising:
   receiving the signal, a waveform of the signal varying according to a distance from which the signal was emitted;
   a first processing of the signal to provide a sampled signal;
   defining a plurality of correlation signals corresponding respectively to at least part of a plurality of sampled waveforms of the signal respectively emitted from distances of different values so that a sum of a maxima of intercorrelations performed respectively between the correlation signals and the sampled waveforms is substantially constant over an interval including the values of the distances; and
   a correlation processing of the sampled signal to provide correlation values, and comprising
   a plurality of elementary correlation processings respectively performed with the correlation signals and each delivering initial correlation values, and
   a summation of the initial correlation values respectively delivered by the elementary correlation processings to obtain the correlation values.

2. The method according to claim 1, wherein the signal is a pulse signal, the shape of pulses of the signal varying according to the distance from which the signal was emitted, and wherein the correlation signals comprise correlation masks corresponding respectively to at least part of a plurality of sampled pulses of the signal respectively emitted at distances of different values defined so that the sum of the maxima of intercorrelations performed respectively between the correlation masks and the shapes of sampled pulses is substantially constant over the interval.

3. The method according to claim 2, wherein the signal comprises a modulated ultra wideband signal and the first processing delivers successive groups of samples of the signal in parallel, and each elementary correlation processing is performed on the successive groups of samples and delivers successive blocks of initial correlation values.

4. The method according to claim 3, wherein which the signal comprises an ultra wideband signal modulated by a digital pulse interval modulation.

5. The method according to claim 2, wherein each correlation mask comprises $M_m$ mask samples, the first processing comprises an initial processing for sampling the signal delivering successive blocks of N samples in parallel and a storage processing performing successive storings of the $M_m-1$ last samples of the blocks, a current group of samples comprising the $M_m-1$ stored samples of a previous block and the N samples of the current block.

6. The method according to claim 5, wherein the elementary correlation processing comprises N correlations in parallel performed on each group of $N+M_m-1$ samples with the correlation mask and delivering for each group of samples a block of N initial correlation values.

7. A device for processing a signal, comprising:
   an input to receive the signal;
   a first processor coupled to the input to provide a sampled signal;
   a memory to store a plurality of correlation signals corresponding respectively to at least part of a plurality of sampled waveforms of the signal respectively emitted at distances of different values so that a sum of the maxima of intercorrelations respectively performed between the correlation signals and the sampled waveforms is substantially constant over an interval including the values of the distances; and
   a correlation processor coupled to the first processor to provide correlation values, and comprising
   a plurality of elementary processors able to respectively perform elementary correlation processings with the correlation signals and to each deliver initial correlation values, and
   a summation unit connected to receive the initial correlation values on outputs of the elementary processors and to provide the correlation values.

8. The device according to claim 7, wherein the signal comprises a pulse signal, the shape of the pulses of the signal varying according to the distance from which the signal was emitted, and wherein the correlation signals are correlation masks corresponding respectively to at least part of several sampled pulses of the signal respectively emitted at several distances of different values defined so that the sum of the maxima of intercorrelations performed respectively between the correlation masks and the shapes of sampled pulses is substantially constant over the interval.

9. The device according to claim 8, wherein the signal comprises a modulated ultra wideband signal, wherein which the first processor delivers successive groups of samples of the signal in parallel, and each elementary processor performs the elementary correlation processing on the successive groups of samples to deliver successive blocks of initial correlation values.

10. The device according to claim 9, wherein the signal comprises an ultra wideband signal modulated by a digital pulse interval modulation.

11. The device according to claim 8, wherein each correlation mask comprises $M_m$ mask samples; the first processor comprising a sampling unit to deliver successive blocks of N samples in parallel, a processor memory to successively store the $M_m-1$ last samples of the blocks, each current group of samples able to be delivered by the first processor comprising the $M_m-1$ stored samples of a previous block and the N samples of a current block.

12. The device according to claim 11, wherein each elementary processor performs N correlations in parallel on each group of $N+M_m-1$ samples with the corresponding correlation mask and delivers for each group of samples a block of N initial correlation values.

13. A wireless communications receiver comprising:
an antenna to receive a signal; and
a device for processing the signal, and comprising
an input coupled to the antenna,
a first processor coupled to the input to provide a sampled signal,
a memory to store a plurality of correlation signals corresponding respectively to at least part of a plurality of sampled waveforms of the signal respectively emitted at distances of different values so that a sum of the maxima of intercorrelations respectively performed between the correlation signals and the sampled waveforms is substantially constant over an interval including the values of the distances, and
a correlation processor coupled to the first processor to provide correlation values, and comprising
a plurality of elementary processors able
to respectively perform elementary correlation processings with the correlation signals and to each deliver initial correlation values, and
a summation unit connected to receive the initial correlation values on outputs of the elementary processors and to provide the correlation values.

14. The wireless communications receiver according to claim 13, wherein the signal comprises a pulse signal, the shape of the pulses of the signal varying according to the distance from which the signal was emitted, and wherein the correlation signals are correlation masks corresponding respectively to at least part of a plurality of sampled pulses of the signal respectively emitted at distances of different values defined so that the sum of the maxima of intercorrelations performed respectively between the correlation masks and the shapes of sampled pulses is substantially constant over the interval.

15. The wireless communications receiver according to claim 14, wherein the signal comprises a modulated ultra wideband signal, wherein which the first processor delivers successive groups of samples of the signal in parallel, and each elementary processor performs the elementary correlation processing on the successive groups of samples to deliver successive blocks of initial correlation values.

16. The wireless communications receiver according to claim 15, wherein the signal comprises an ultra wideband signal modulated by a digital pulse interval modulation.

17. The wireless communications receiver according to claim 14, wherein each correlation mask comprises $M_m$ mask samples; the first processor comprising a sampling unit to deliver successive blocks of N samples in parallel, a processor memory to successively store the $M_m-1$ last samples of the blocks, each current group of samples able to be delivered by the first processor comprising the $M_m-1$ stored samples of a previous block and the N samples of a current block.

18. The wireless communications receiver according to claim 17, wherein each elementary processor performs N correlations in parallel on each group of $N+M_m-1$ samples with the corresponding correlation mask and delivers for each group of samples a block of N initial correlation values.

* * * * *